ated Aug. 11, 1964

3,144,464
β - PHENYL - β - HYDROCARBON - HYDRACRYLIC ACID-2-N,N-DIETHYLAMINE ETHYL ESTERS
Hartmund Wollweber and Rudolf Hiltmann, Wuppertal-Elberfeld, Georg Kimmerle, Blankenstein (Ruhr), and Horst Kreiskott, Wuppertal-Elberfeld, Germany, assignors to Farbenfabriken Bayer Aktiengesellschaft, Leverkusen, Germany, a corporation of Germany
No Drawing. Filed Feb. 25, 1960, Ser. No. 10,866
Claims priority, application Germany Feb. 27, 1959
4 Claims. (Cl. 260—340.5)

This invention relates to, and has as its object, the production of novel basic substituted esters of hydracrylic acid and, more specifically, to basic substituted esters of β-substituted hydracrylic acid, which have been found to constitute therapeutically useful compounds and which are particularly effective in the treatment of Parkinson's disease.

It has already been established that basic esters of carboxylic acids can be obtained by reacting the free acids or the functional acid derivatives thereof with amino alcohols or their derivatives, which react with the acids and acid derivatives with ester formation.

It has now been discovered that therapeutically valuable compounds, which are relatively non-toxic and which have a marked and sustained anti-tremorin activity and are particularly effective in the treatment of Parkinson's disease, can be obtained if the carboxylic acids used in the esterification reaction are β-substituted hydracrylic acids of the following general formula or their functional derivatives:

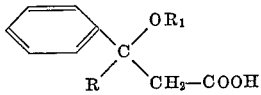

in which $R_1$ represents hydrogen or an acyl radical and R represents a saturated or unsaturated bicyclo-(2,2,1)-heptyl radical, nortricyclyl-, isopropyl-, isopropenyl- or the tertiary butyl radical. The phenyl core can be substituted, if necessary, with one or more alkoxy-, methylenedioxy- or mercapto-groups and preferably is one of the following: phenyl, alkoxyphenyl, methylene dioxyphenyl and alkylmercaptophenyl. In the esterification reaction of the carboxylic acid or its functional derivative with the amino alcohol or its functional derivative, novel compounds are obtained, which possess the general formula

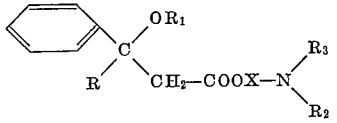

in which R and $R_1$ are as defined above, X is a straight or branched chain alkylene group, $R_2$ and $R_3$ each represent an alkyl radical, and $R_2$ and $R_3$ may be joined with one another or one of $R_2$ and $R_3$ with a carbon atom of X to form a heterocyclic N-containing ring which may also be substituted as for example a piperidino, piperazino, pyrrolidino or morpholino ring.

The novel basic substituted esters of β-substituted hydracrylic acid can be prepared in the known manner by reacting the free carboxylic acid or its functional derivative with an amino alcohol. The reaction may be effected, employing inert solvents and diluents and preferably is carried out at an elevated temperature. It has been found advantageous to carry out the reaction in the presence of a hydrogen-halide binding agent, such as for example basic alcoholate.

Alternatively, the β-substituted hydracrylic acid esters can be inter-esterified with amino alcohols. This inter-esterification reaction is carried out by reacting a β-substituted hydracrylic acid ester and an amino alcohol in the presence of a basic catalyst, as for example an alkali metal, preferably in the additional presence of a solvent, as for example toluene or xylene, at a temperature of up to 150° C. The inter-esterification may, if necessary, be effected at a reduced pressure. Subsequently, the hydroxyl group can be acylated at normal or at an elevated temperature with a carboxylic acid anhydride or carboxylic acid chloride. The compounds obtained in this way can be decomposed into their optically active components.

Inasmuch as the compounds obtained according to the processes described above are unsaturated, the corresponding saturated compounds can be obtained by hydrogenation.

Salts, like citrates, succinates, acetates, lactates, bitartrates, naphthalene disulfonates, hydrochlorides, hydrobromides, hydroiodides, nitrates, sulfates etc., can easily be produced by reacting the free basic esters with the corresponding acids in a solvent. Generally, the salt separates after the reaction; otherwise, the solvent must be removed leaving behind the salt.

Basic β-diphenyl hydracrylic acid esters have already been described (Ann. Rept. Tohuku Coll. Pharm No. 2 (1955), 42–49; Journ. Am. Chem. Soc. 65 (1943), 1967), which have a moderately analgesic, mydriatic and local anesthetic effect. By the substitution of a bicyclo-(2,2,1)-heptenyl-, nortricyclyl-, isopropyl- or tertiary butyl radical in place of the phenyl group, compounds are obtained which, in comparison with the described β-diphenylhydracrylic acid esters, possess an entirely different pharmacological effect.

The compounds have demonstrated in experimental studies a strong anti-Parkinson effect, which for example the known diphenyl hydracrylic acid esters completely lack. A comparison of the therapeutic indices makes this particularly clear.

The better toleration of the known compounds, as compared to the previously known compounds, and the effectiveness of the compounds as anti-tremorin agents has been demonstrated by quantitative data on acute toxicity and pharmacological determinations.

The following table contains a compilation of results of animal experiments. For testing the anti-Parkinson effect, a modification of the experiment of Everett (Science 177 (1956), page 1238) was employed: White mice, brought into water of 37° C., keep swimming for a long time, in any case more than 8 hours. If, however, "Tremorin" is injected in a dose of 25 mg./kg. of mouse intravenously, they drown regularly inside 30 minutes. This affords the possibility to test antagonists of "Tremorin" whether they can prevent death by drowning. For the test, each time a group of 10 mice was used, and the substance tested as a "Tremorin" antagonist was likewise injected intravenously immediately following the "Tremorin" injection. The active substances were further tested for their toxicity by intravenous injection in the mice. As a measure of the activity, the therapeutic index can be calculated therefrom, as the proportion of the $LD_{50}$ to the $ED_{50}$, i.e., the dose which saves saves 50% of the animals intoxicated with "Tremorin."

The starting β,β-disubstituted hydracrylic acid ester used in accordance with the invention can be obtained with various known methods, as for example by reaction of a corresponding ketone with bromacetic acid ester according to Reformatsky. The carboxylic acids are obtained as a result of saponification. By this process, for example, the following compounds can be produced:

β-Phenyl-β-(2-bicyclo[2,2,1]-heptene-(5)-yl)-hydracrylic acid, M.P. 124–126° C.; ethyl ester B.P.$_{0.2}$ 140° C.

β-Phenyl-β-(2-nortricyclyl)-hydracrylic acid ethyl ester, B.P. 140° C.

β-Phenyl-β-isopropyl-hydracrylic acid, M.P. 118–119° C.; ethyl ester B.P.$_{0.7}$ 108–110° C.

β-Phenyl-β-isopropenyl-hydracrylic acid, M.P. 124–125° C.; ethyl ester B.P.$_{1.5}$ 114–118° C.

β-Phenyl-β-tert. butyl-hydracrylic acid, M.P. 114–115° C.; ethyl ester B.P.$_{0.2}$ 100° C.

β-(p-Methoxyphenyl)-β-isopropyl-hydracrylic acid, M.P. 115° C.

β-(p-Ethoxyphenyl)-β-isopropyl-hydracrylic acid, M.P. 115–116° C.

β-(3,4-dimethoxyphenyl)-β-isopropyl - hydracrylic acid, M.P. 113–114° C.

β-(3,4 - methylenedioxyphenyl)-β-isopropyl - hydracrylic acid, M.P. 133–134° C.

Example 1

40 g. β-phenyl-β-(2-bicyclo-[2,2,1]-heptene-(5)-yl)-hydracrylic acid ethyl ester is heated with 38 g. 2-N,N-diethylaminoethanol and 0.5 g. sodium in an oil bath at a temperature of from 110–120° C. until 20 cc. of a Vigreux column of ethanol are liberated by the reaction. The excess diethylaminoethanol is distilled in vacuum. The residue is dissolved in dilute hydrochloric acid, washed with ether and made alkaline with a potash solution. The separated oil is dissolved in ether and, after being dried over potash, is subjected to vacuum distillation. The yield is 33 grams β-phenyl-β-(2-bicyclo-[2,2,1]-heptene-(5)-yl)-hydracrylic acid-2,N,N-diethylamino ethyl ester having B.P.$_{0.15}$ 180–184° C. The citrate is produced from the ester by the addition of a mol citric acid in an isopropanol solution. M.P. 86–87° C.

TABLE

| | $ED_{50}$, mg./kg., mouse, i.v. | $LD_{50}$, mg./kg., mouse, i.v. | Therapeutic index |
|---|---|---|---|
| (a) Known compound: (diphenyl structure) | ---------- | 40 | ---------- |
| (b) Compounds in accordance with the invention: | | | |
| (norbornenyl structure) citrate | 5.0 | 125 | 25 |
| (cyclohexenyl structure) citrate | 1.4 | 100 | 71 |
| (CH$_3$)$_3$C— structure, citrate | 3.0 | 150 | 50 |
| (CH$_3$)$_2$CH— structure, citrate | 0.75 | 87.5 | 115 |

The following examples are given by way of illustration and not limitation:

In analogous fashion, the β-phenyl-β-(-2-nortricyclyl)-hydracrylic acid-2-N,N-diethylaminoethyl ester, B.P.$_1$ 190°

C., citrate M.P. 92–93° C., is obtained from β-phenyl-β-(2-nortricyclyl)-hydracrylic acid ester and 2-N,N-diethylaminoethanol.

*Example 2*

22.2 g. β-phenyl-β-tert. butyl-hydracrylic acid is added to a solution of 2.3 g. sodium in 100 cc. isopropanol. 18 g. 2-N,N-diethylaminoethylchloride-hydrochloride is introduced and the mixture heated under reflux for 6 hours. The solvent is distilled off in vacuum. The residue is dissolved in dilute hydrochloric acid and the unsubstituted initial material washed in ether. The hydrochloric acid phase is made alkaline. The oil, separated out after being extracted with ether, is subjected to distillation. The yield is 22 g. β-phenyl-β-tert.-butyl-hydracrylic acid-2-N,N-diethylaminoethyl ester having a B.P.$_{0.1}$ 146–148° C. Citrate M.P. 101–102° C.

*Example 3*

15 g. β-phenyl-β-isopropyl-hydracrylic acid is heated overnight under reflux with 13 g. 3-N-pyrrolidinopropyl-chloride in 100 cc. of isopropanol. After the hot solution has been fitered, the solvent is distilled off in a vacuum. The residue is dissolved in ether, and the base is liberated through the addition of potash. From the ether solution, after drying over potassium carbonate and distilling off of the solvent, β-phenyl-β-isopropyl-hydracrylic acid-3-N-pyrrolidinopropyl ester with B.P.$_{0.3}$ 158–162° is obtained in a mixture of almost colorless oil. To change to the citrate, an alcohol solution of the ester with the calculated mixture of citric acid (1 mol) is added. On cooling, the citrate separates out into colorless crystals.

In analogous manner, the following esters can be obtained by reaction of corresponding β-disubstituted hydracrylic acids and the corresponding aminoalkylhalides:

β - Phenyl - β-isopropyl-hydracrylic acid-3-N,N-dimethylaminopropyl ester, B.P.$_{0.3}$ 140° C.; citrate M.P. 63–65° C.

β - Phenyl - β-isopropyl-hydracrylic acid-2-N,N-dimethylaminopropyl ester, B.P.$_{0.6}$ 134° C.; hydrochloride M.P. 104–105° C.

β - Phenyl - β-isopropyl-hydracrylic acid-2-N,N-dimethylaminoethyl ester, B.P.$_{0.3}$ 128° C.; citrate M.P. 74–75° C.

β - Phenyl - β-isopropyl-hydracrylic acid-2-N-pyrrolidinoisopropyl ester, B.P.$_{0.6}$ 162° C.; citrate M.P. 78–80° C.

β - Phenyl-β-isopropyl-hydracrylic acid-2-N-pyrrolidinoethylester, B.P.$_{0.3}$ 158° C.; citrate M.P. 75–76° C.

β - Phenyl - β - isopropyl-hydracrylic acid-3-N,N-diethylaminopropyl ester, B.P.$_{0.3}$ 164° C.; citrate M.P. 77–78° C.

β - Phenyl - β - isopropyl-hydracrylic acid-2,N,N-diethylaminoethyl ester, B.P.$_{0.1}$ 144° C.; citrate M.P. 770 C.

β - Phenyl-β-isopropyl-hydracrylic acid-2-(2-piperindine-N-methyl) ethyl ester, B.P.$_{0.3}$ 180° C.

β - Phenyl - β - isopropyl - hydracrylic acid - N - methyl-piperidyl-(3)-ester, B.P.$_{0.6}$ 170° C.; hydrochloride M.P. 124–126° C.

β-Phenyl-β-isopropyl-hydracrylic acid - 2,N,N-dimethyl-amino-2,2-dimethylethyl ester, B.P.$_{0.8}$ 128° C.; hydrochloride M.P. 98–99° C.

β-Phenyl-β-isopropenyl-hydracrylic acid-2,N,N-dimethylaminoethyl ester, B.P.$_{0.5}$ 154–156° C.; hydrochloride M.P. 99° C.

β-(p-Methoxyphenyl)-β-isopropyl-hydracrylic acid - 2-N-pyrrolidinoethyl ester, B.P.$_{0.5}$ 185° C.; citrate M.P. 69–70° C.

β-(p-Methoxyphenyl)-β-isopropyl-hydracrylic acid-2-N,N-diethylaminoethyl ester, B.P.$_{0.3}$ 175° C.; citrate M.P. 85–87° C.

β-(3,4-dimethoxyphenyl)-β-isopropyl-hydracrylic acid-2-N,N-diethylaminoethyl ester, B.P.$_{0.3}$ 190° C.; citrate M.P. 98–99° C.

β - (3,4 - methylenedioxyphenyl)-β-isopropyl-hydracrylic acid-2-N,N-diethylaminoethyl ester, B.P.$_{0.5}$ 186–188° C.; citrate M.P. 54–55° C.

β-(p-Ethoxyphenyl)-β-isopropyl-hydracrylic acid-2-N,N-diethylaminoethyl ester, B.P.$_{0.3}$ 180° C.; citrate M.P. 89° C.

*Example 4*

22.2 g. β-phenyl-β-isopropyl-hydracrylic acid is heated overnight in a reflux with 100 cc. of isopropanol with 14.7 g. 2-N-piperidino-ethylchloride. The solution is filtered hot, reduced to 45 cc. and washed with ether. The yield is 30 g. β-phenyl-β-isopropyl-hydracrylic acid-2-N-piperidinoethyl ester hydrochloride, M.P. 122–123° C. In the same way, β-phenyl-β-isopropyl-hydracrylic acid-2-N-morpholinoethyl ester hydrochloride, M.P. 125–126° C. is obtained from β-phenyl-β-isopropyl-hydracrylic acid and 2-N-morpholinoethyl ester hydrochloride.

The new compounds or their salts may find application as drugs in the form of pharmaceutical preparations, which contain them in mixtures with organic or inorganic, solid or liquid vehicles, adapted to oral or parenteral administration, possibly with other pharmaceutical agents added.

We claim:

1. β-Phenyl-β-tert. butyl-hydracrylic acid-2,N,N-diethylaminoethyl ester.

2. β - Phenyl - β - isopropyl-hydracrylic acid-2-N,N-diethylaminoethyl ester.

3. β-(p-Methoxyphenyl)-β-isopropyl-hydracrylic acid-2-N,N-diethylamino ethyl ester.

4. β - (3,4 - methylenedioxyphenyl)-β-isopropyl-hydracrylic acid-2-N,N-diethylaminoethyl ester.

References Cited in the file of this patent

UNITED STATES PATENTS

| | | |
|---|---|---|
| 2,872,374 | Beiler et al. | Feb. 3, 1959 |
| 2,884,426 | Kottler et al. | Apr. 28, 1959 |
| 2,922,744 | Mills et al. | Jan. 26, 1960 |
| 2,922,795 | Blicke | Jan. 26, 1960 |
| 2,987,517 | Martin et al. | June 6, 1961 |

OTHER REFERENCES

Blicke et al.: "J. Am. Chem. Soc.," vol. 65, pp. 1967–1970 (1943).

Breusch et al.: "Chemical Abstracts," vol. 49, page 10,885 (1955).